United States Patent [19]

Brolin et al.

[11] Patent Number: 4,728,760
[45] Date of Patent: Mar. 1, 1988

[54] INDUCTION HEATING PRESSURE WELDING WITH ROTARY BUS BAR JOINT

[75] Inventors: Charles A. Brolin; Dennis A. Jennerjohn; Richard E. Moeller, all of Cedar Rapids, Iowa

[73] Assignee: FMC Corporation, Chicago, Ill.

[21] Appl. No.: 895,399

[22] Filed: Aug. 11, 1986

[51] Int. Cl.$^4$ .............................................. B23K 13/00
[52] U.S. Cl. .................................. 219/9.5; 219/10.79
[58] Field of Search ................... 219/9.5, 56, 57, 59.1, 219/61.2; 174/68 B, 70 B, 71 B, 72 B, 88 B, 99 B, 129 B, 133 B, 149 B

[56] References Cited

U.S. PATENT DOCUMENTS

| | | | |
|---|---|---|---|
| 2,144,377 | 1/1939 | Kennedy | 219/11 |
| 2,542,393 | 7/1948 | Chapman | 219/9.5 |
| 2,604,569 | 7/1952 | Denneen | 219/10 |
| 2,629,805 | 2/1953 | Body | 219/10 |
| 2,649,527 | 8/1953 | Chapman | 219/9.5 |
| 2,678,370 | 5/1954 | Denneen | 219/10 |
| 2,798,141 | 7/1957 | Longacre | 219/9.5 |
| 2,805,316 | 9/1957 | Chapman | 219/72 |
| 2,892,914 | 6/1959 | Rudd | 219/9.5 |
| 2,919,335 | 12/1959 | Shaughnessy | 219/9.5 |
| 2,928,923 | 3/1960 | Rietsch | 219/9.5 |
| 3,007,022 | 10/1961 | Jackson | 219/9.5 |
| 3,197,609 | 7/1965 | Sommer | 219/99 |
| 3,202,791 | 8/1965 | Gillock et al. | 219/9.5 |
| 3,254,404 | 6/1966 | Becker | 219/9.5 |
| 3,374,529 | 3/1968 | Osborn, Jr. et al. | 29/482 |
| 3,389,238 | 6/1969 | Shaw | 219/9.5 |
| 3,591,757 | 7/1971 | Rudd | 219/67 |
| 4,012,616 | 3/1977 | Zelahy | 219/9.5 |
| 4,197,441 | 4/1980 | Rudd | 219/9.5 |
| 4,327,265 | 4/1982 | Edinger | 219/9.5 |

FOREIGN PATENT DOCUMENTS 1469561 4/1977 United Kingdom .

OTHER PUBLICATIONS

Article entitled "Buttwelder Leaves No Flash", appearing in Steel publication dated Sep. 22, 1958 (2 pages).
Article entitled, "High Frequency Induction Welding of Butt Joints in Tubes", by V. M. Korsunov, dated 1968 (7 pages).
Article entitled "Pressure Butt Welding of Steel Pipe using Induction Heating", by S. G. Harris in Welding Research Supplement, Feb. 61 (8 pages).
Report entitled "Flash Butt Welding for Large Diameter Pipes", by Herman Muesch et al presented in 1981 at Offshore Technology Conference, (14 pages).
Article entitled "Welding on Pipe Line Right-of-Way" in Mechanical Working & Steel Processing, dated 1969 (2 pages).

Primary Examiner—A. D. Pellinen
Assistant Examiner—Leon K. Fuller
Attorney, Agent, or Firm—Raymond E. Parks; Alan J. Moore; Richard B. Megley

[57] ABSTRACT

A method and apparatus is disclosed for induction heating weldable surfaces and moving the heated surfaces together with sufficient force to upset the surfaces while in a substantially inert atmosphere for thereby welding the surfaces together. The apparatus includes a rotary bus bar joint for moving the induction coil between the weldable surfaces, and also includes a clamping mechanism for handling members having weldable surfaces of different sizes and shapes. A pair of separately controlled induction coils may be used with or without laminations for heating tubular or solid members to an upsetting temperature.

11 Claims, 13 Drawing Figures

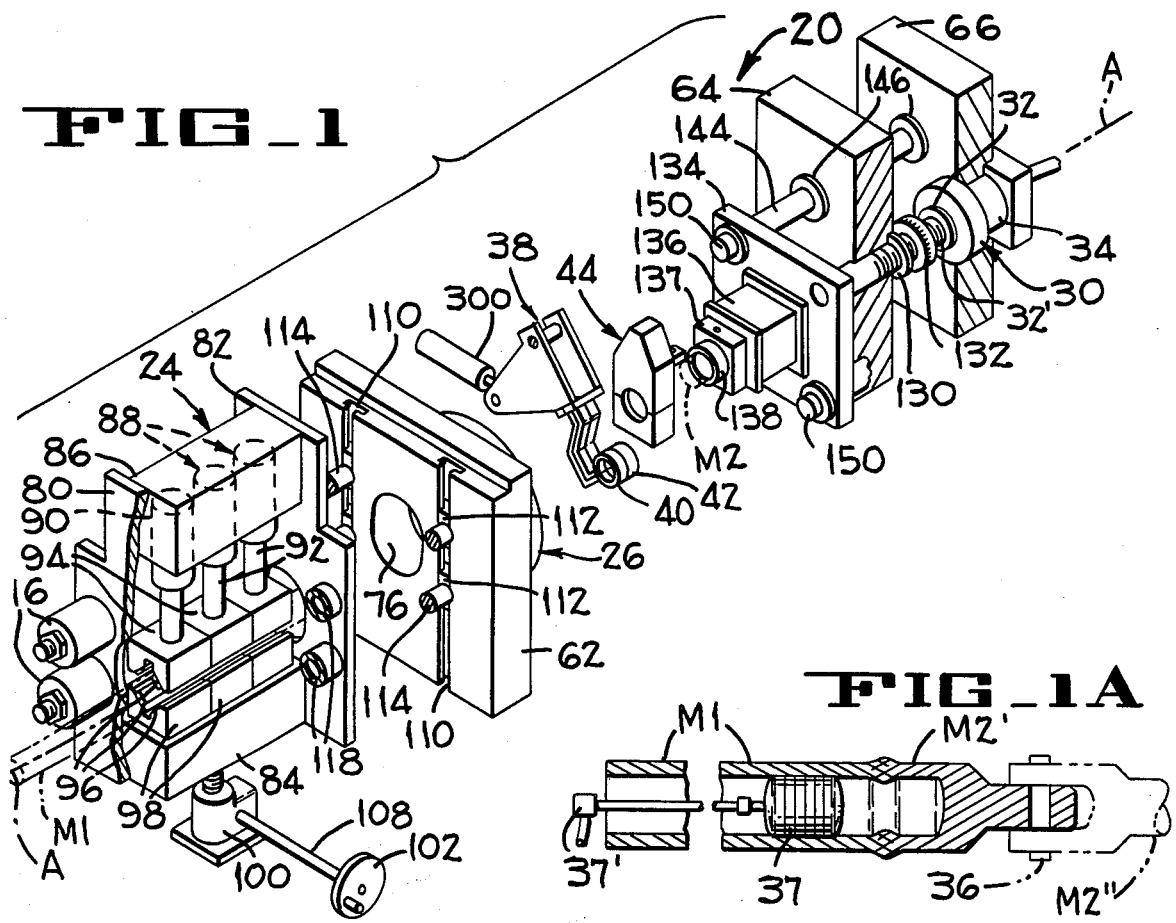
FIG_1
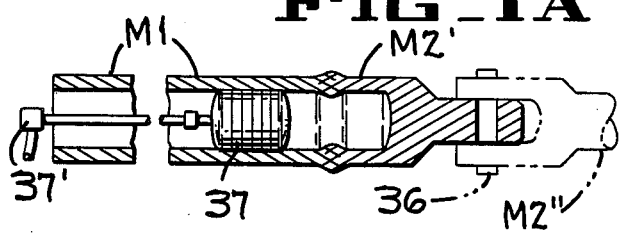
FIG_1A
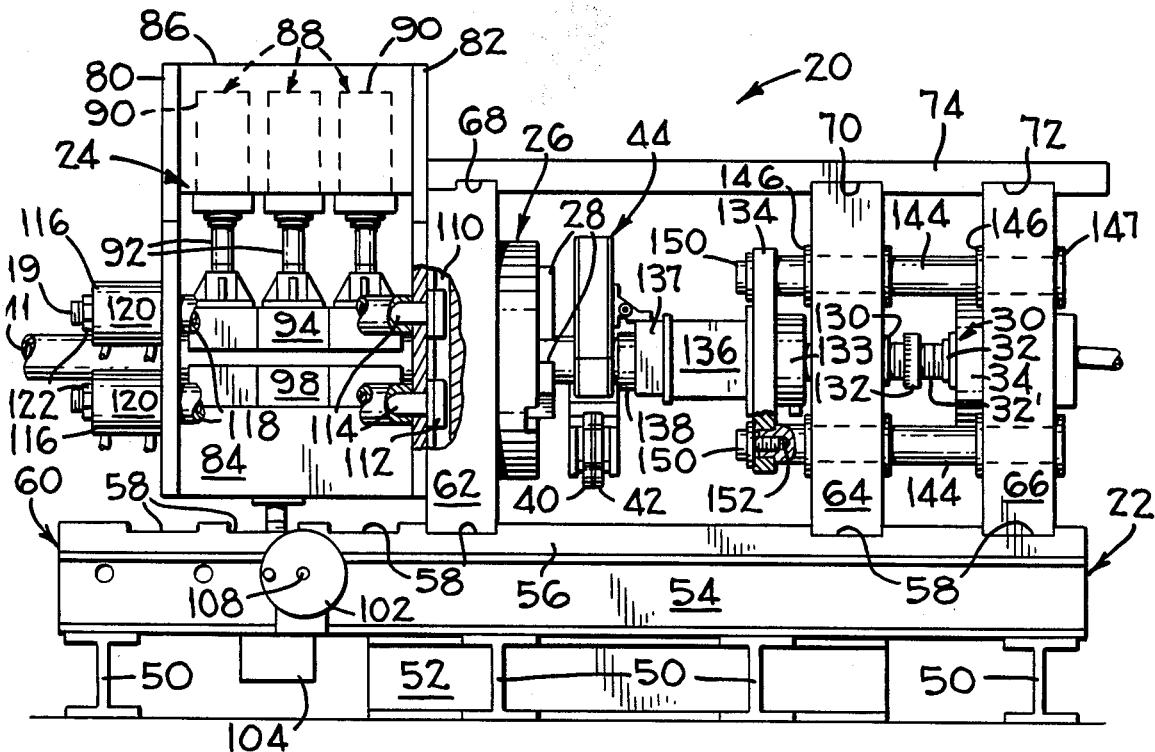
FIG_2

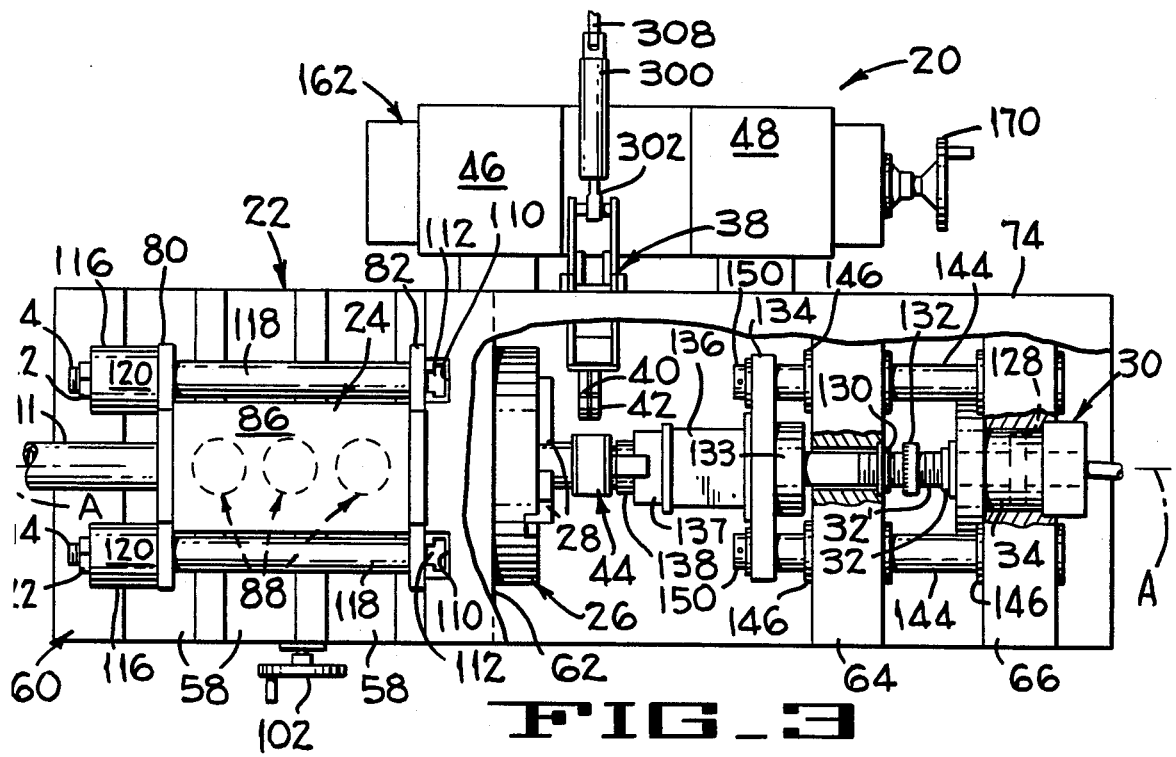
FIG_3
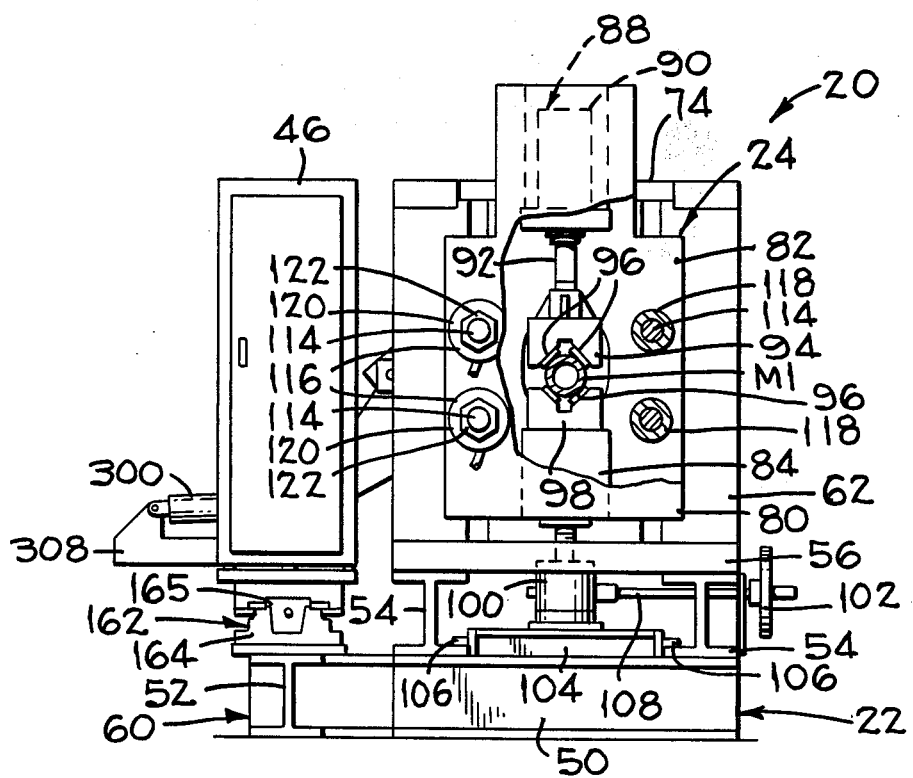
FIG_4

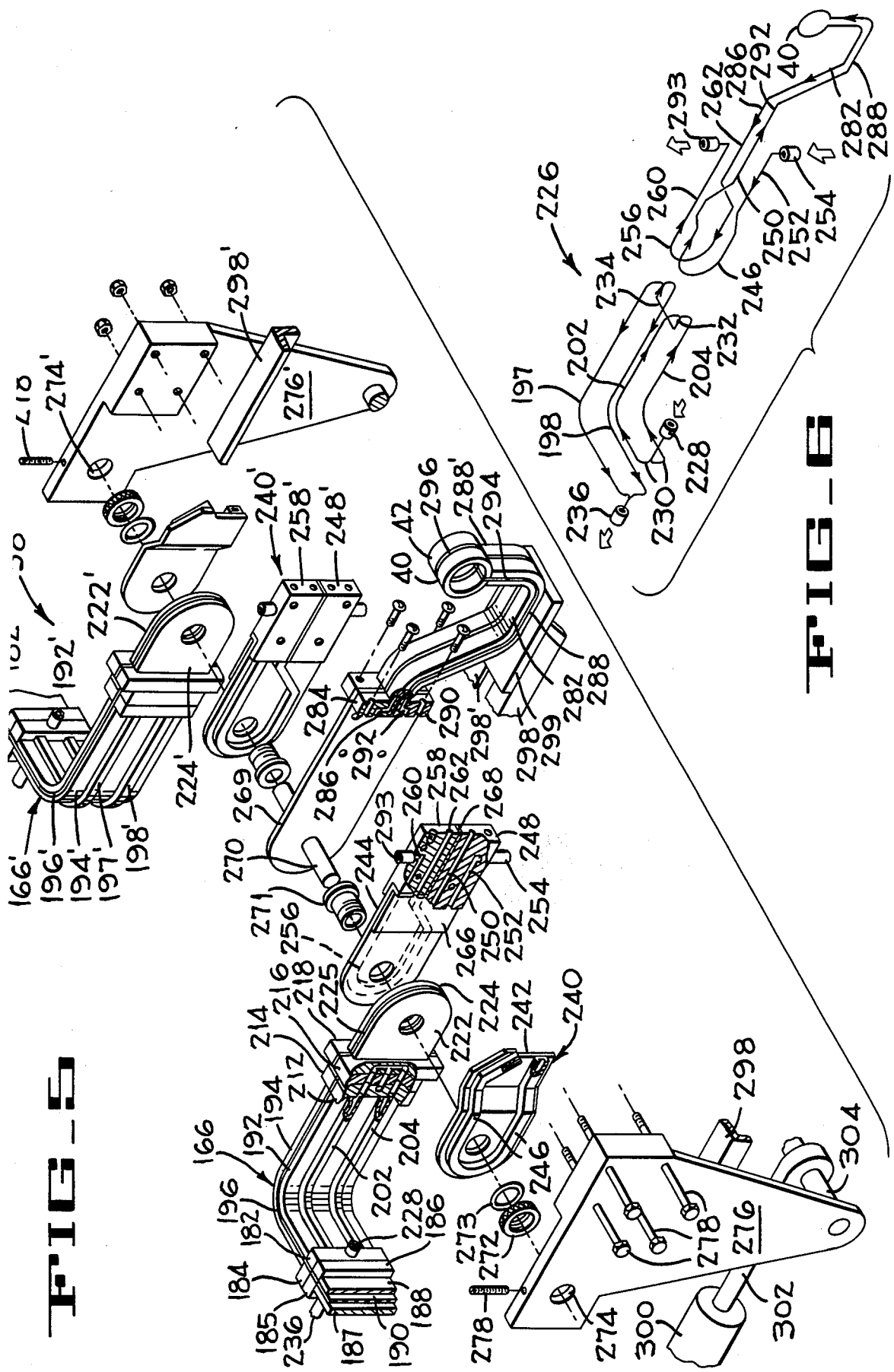

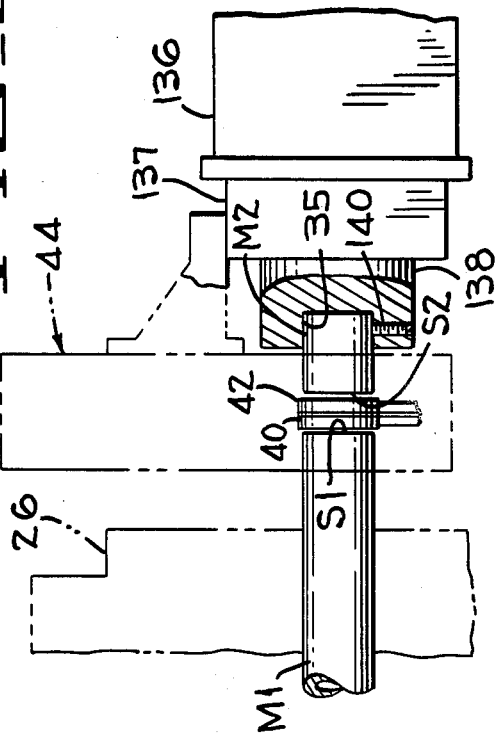
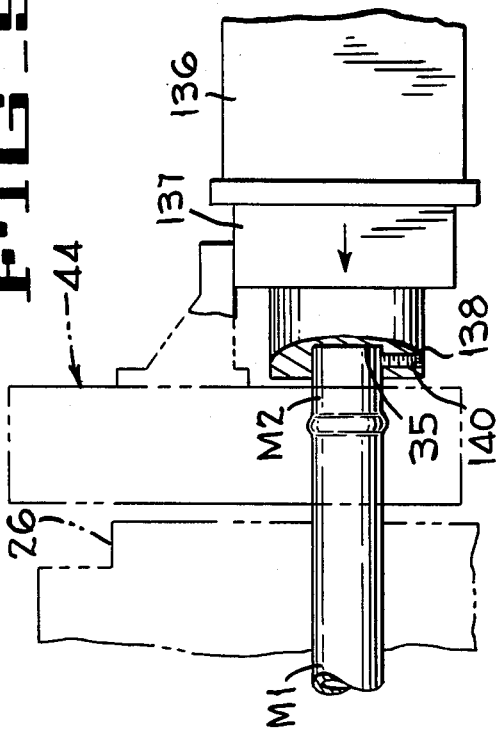
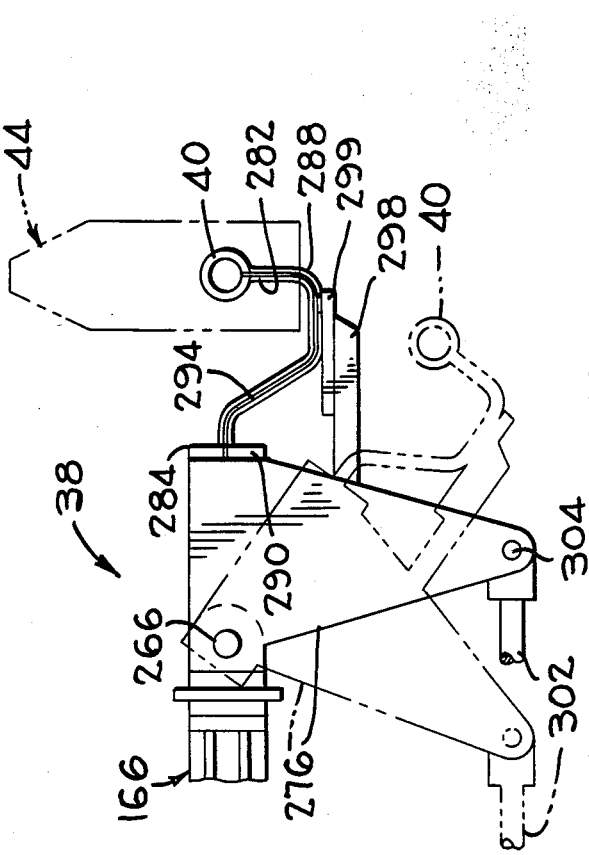
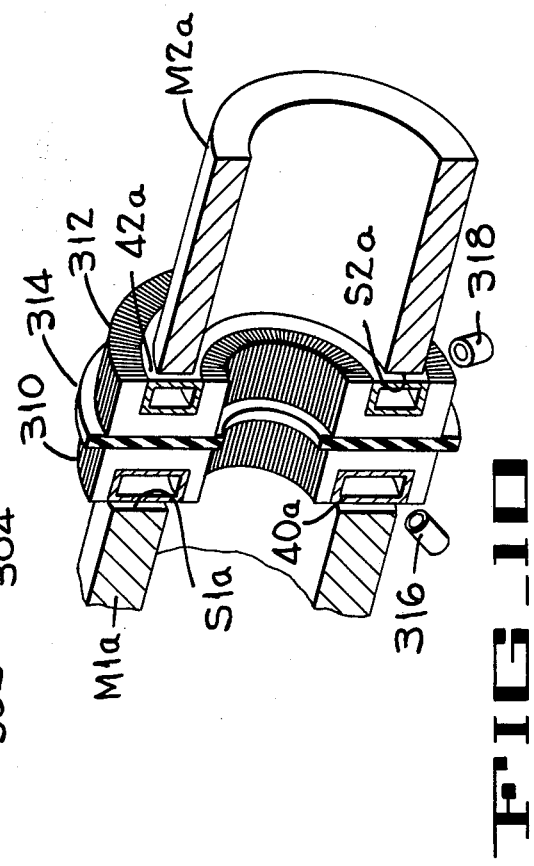

FIG_11
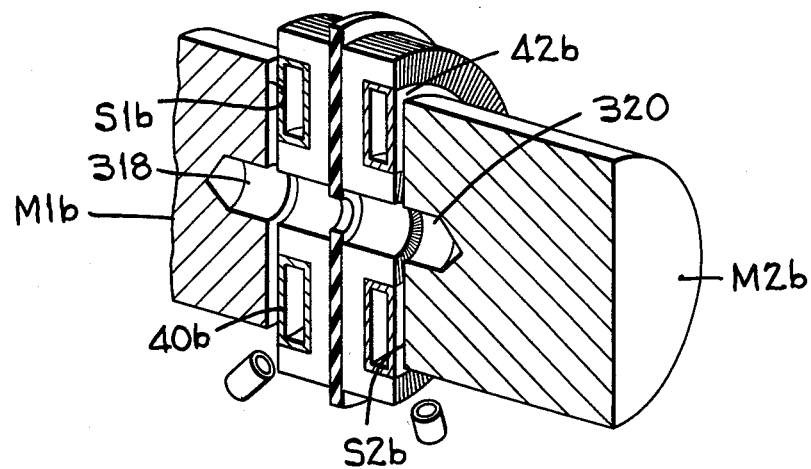
FIG_12
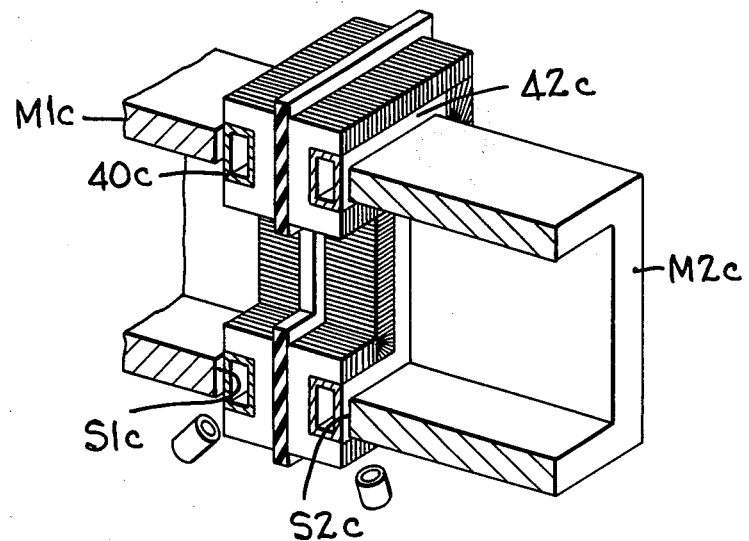

INDUCTION HEATING PRESSURE WELDING WITH ROTARY BUS BAR JOINT

CROSS REFERENCE TO RELATED APPLICATIONS

The present invention relates to the inventions described in the following applications all of which are assigned to the assignee of the present invention, and are incorporated by reference herein.

Brolin U.S. application Ser. No. 844,656 filed on Mar. 27, 1986 entitled Induction Heating Pressure Welding.

Brolin U.S. application Ser. No. 902,858 filed on Sept. 02, 1986 entitled Induction Heating With Adjustable Linear Bus Bar.

Brolin et al U.S. application Ser. No. 895,085 filed on Aug. 11, 1986 entitled Inert Atmosphere Control For Induction Heating Pressure Welding System.

Brolin et al U.S. application Ser. No. 896,904 filed on Aug. 11, 1986 entitled Dual Induction Heat Pressure Welding Control Circuit.

BACKGROUND OF THE INVENTION

Field of the Invention

The present invnetion relates to welding and more specifically relates to welding metal members together by induction heating weldable surfaces of each member to upsetting or welding temperature and immediately thereafter forcing the surfaces together with sufficient force to upset the weldable surfaces and weld them together.

SUMMARY OF THE INVENTION

The welding method and apparatus of the present invention comprises an apparatus which performs the steps of firmly clamping two members with their weldable surfaces spaced apart a sufficient distance to provide a gap therebetween of sufficient size to receive at least one induction coil and air gaps therebetween. A substantially oxygen free inert atmosphere is formed around the weldable surfaces and induction coil and are then subjected to a high frequency current which heats the weldable surfaces. Immediately thereafter the induction coil is moved away from the weldable surfaces and the two members are forced together with sufficient force to upset the heated surfaces and weld them together. The weldable surfaces are preferably of a fine finish.

BRIEF DESCRIPTION OF THE DRAWINGS

FIG. 1 is an exploded perspective of major components of the induction welding apparatus of the present invention, certain parts being broken away and other parts being shown in section.

FIG. 1A is a central vertical section of two members welded together with an inflatable air plug in one member.

FIG. 2 is a front elevation of the induction welding apparatus, certain parts being cut away.

FIG. 3 is a top plan of the induction welding apparatus, certain parts being cut away.

FIG. 4 is a left end view of the apparatus of FIG. 1 with certain parts being cut away.

FIG. 5 is an exploded perspective of a rotary bus bar joint and two induction coils with certain parts being cut away to illustrate portions of the water cooling passages within the rotary joint FIG. 6 is a diagram in perspective illustrating the route and direction of flow of cooling liquid through the left half of the bus bar, the bus bar joint and the left induction coil.

FIG. 7 is an operational view in side elevation illustrating the induction coils in solid lines in a member heating position within an inert atmosphere hood, and in an inoperative position in phantom lines.

FIG. 8 is an operational view in frontal elevation illustrating the induction coils in member heating position, the inert atmospheric hood being shown in phantom lines.

FIG. 9 is an operational view illustrating the two members welded together with the inert atmospheric hood moved to the left with the piston rod of a hydraulic cylinder.

FIG. 10 is a perspective in central section illustrating a pair of induction heating coils adapted to independently heat different size members to an upsetting temperature and having laminations to aid the heating process.

FIG. 11 is a perspective similar to FIG. 10 but illustrating laminated induction coils for heating cylindrical members to upsetting temperature.

FIG. 12 is a perspective similar to FIG. 10 but illustrating laminated induction coils for heating square or rectangular members to a bonding temperature.

DESCRIPTION OF THE PREFERRED EMBODIMENT

The induction welding apparatus 20 (FIGS. 1-4) of the present invention comprises a heavy frame 22 which supports an ajustable clamping mechanism 24 capable of rigidly supporting a first workpiece or member M1, illustrated as a tube, which may vary in size between about 2½ inches to at least 6 inchyes in diameter. The member M1 is accurately centered on a fixed longitudinal axis A with a conventional chuck 26 having movable jaws 28 that are simultaneously adjusted by a screw mechanism and wrench (not shown). The frame 22 also supports a hydraulic cylinder 30 having its longitudinal axis concentric with axis A. The cylinder includes a piston rod 32 and a threaded extension 32' which extends out of the left hand end (FIG. 2) of a cylinder case 34 and is operatively connected to an adapter having a cavity 35 (FIGS. 8 and 9) to snugly receive one end of a second member M2 which is to be induction welded to the first member M1. The second member M2 is illustrated as a short tube in all Figures except FIG. 1A which illustrates a male lug M2' that is induction welded to the first member M1; and a female lug M2", shown in phantom lines, connected to the male lug M2' by pin 36. FIG. 1A illustrates one use of the induction welding apparatus which is to weld long (20-40 foot) tubular members to male and female lugs for quickly, accurately and reliably manufacturing lattice booms for use on cranes or the like. An expandable plug 37 is inserted in the member M1 and is expanded into sealing engagement in the member by compressed air from valve and conduit 37' to prevent air in the tube M1 from flowing around the weldable surfaces S1,S2 (FIG. 8) during the heating and welding operation.

The frame 22 also indirectly supports a rotary bus bar joint 38 (FIGS. 1, 5 and 7) which includes two induction coils 40,42 which are moved between the ends of members M1,M2 (FIG. 8) when the weldable end surfaces S1 and S2 of the two members are to be heated to an upsetting temperature and are thereafter immediately rotated away from the members M1,M2 as shown in FIG. 9 to allow the cylinder 30 to force the member M2 into engagement with the member M1. The heating and upsetting operations take place within an inert atmosphere hood 44 which is connected to the piston rod 32 of the cylinder 30 as best shown in FIG. 2. A pair of heat stations containing transformers 46,48 (FIGS. 3 and 4) are also mounted on the frame 22 for horizontal adjustment. The transformer 46 provides current to the induction heating coils 40, while the transformer 48 provides current to the coil 42.

More particularly, the frame 22 includes a plurality of heavy transversely extending I-beams 50 and a short longitudinally extending I-beam 52 (FIGS. 1 and 4) that are supported on a concrete floor, which beams support a pair of longitudinally extending I-beams 54. A horizontal floor plate 56 is provided with a pluraltiy of tranverse grooves 58 therein. The I-beams and plate 56 are bolted together to define a rigid base 60.

As best shown in FIG. 2, three thick transverse walls 62,64 and 66 are fitted into associated ones of the grooves 58; and also are fitted into grooves 68,70 and 72, respectively, formed in a short cover plate 74. The floor plate 56 and cover plate 74 are connected to the walls 62,64 and 66 by a plurality of capscrews (not shown). It will be noted that the wall 62 has a hole 76 (FIG. 1) therein for receiving member M1 and may be secured to any of the four grooves 58 on the left portion of the floor plate 56 if the member M1 is excessively long and requires that the clamping mechanism 24 be moved to the left. If the mechanism 24 is moved to the left, a longer top plate is provided and is appropriately grooved for connection to the walls by capscrews.

The clamping mechanism 24 (FIGS. 1-4) includes a pair of spaced walls 80,82 rigidly secured to a sturdy base 84 and a top wall 86 to which a plurality of hydraulic clamping cylinders 88 are secured. The cylinders 88 each include a cylinder case 90 (FIGS. 1 and 4) and a piston rod 92. An upper V-block gripper head 94 is secured to each piston rod 92 and has two gripper jaws 96 disposed at 90° to each other which cooperate with a pair of lower gripper jaws 96 which are also disposed at 90° to each other and are secured to a lower V-block gripper head 98 that is rigidly secured to the base 84. It is important that the jaws 94,96 be quite long (about 10 inches) as illustrated and be angled at 90° to each other to preserve the ovality of the member M1, if the member is a tube as illustrated, and also to firmly clamp the member M1 from movement when subjected to an upsetting force which may be as high as about 236,00 pounds, depending upon the size of the members M1,M2 being welded together. The clamping mechanism 24 and the strength of the apparatus 20 is capable of upsetting metal having a weldable surface area of up to about 30 square inches. The illustrated clamping mechanism is capable of handling members M1 up to 6 inches in diameter.

The clamping mechanism 24 (FIGS. 1-4) is adapted to be moved horizontally, as previously mentioned, by mounting the wall 62 in different ones of the grooves 58 and providing a cover plate 74 of appropriate length. The entire clamping mechanism 24 is also vertically adjustable by means of a conventional right angle screw jack 100 which is manually operated by a handwheel 102. The jack is mounted on a sub-frame 104 (FIG. 4) having supporting bars 106 engaging flanges of the I-beams 54. Longitudinal movement of the clamping mechanism 24 to different position along the floor plate 56 is allowed after first removing the hand wheel 102 and its shaft 108.

In order to accommodate vertical movement of the clamping mechanism 24 and yet maintain the mechanism firmly against the wall 62 during the upsetting operation, the wall 62 is provided with a pair of T-slots 110 (FIG. 2) which slidable receive T-bars 112 therein. Each T-bar 112 is connected to one end of a piston rod extension 114 of a hollow center hydraulic cylinder 116. Each piston rod extension 114 extends through a tube 118 which abuts the end walls 80,82. Each extension 114 is coupled to an associated piston rod 119 (FIG. 1) which extends through cylinder case 120 with a nut 122 on its protruding end. When it is desired to adjust the clamping mechanism 24 vertically, hydraulic pressure is supplied to the left end of each hydraulic cylinder case 120 thus moving the piston rods 119 and extensions 114 to the right out of clamping engagement with the wall 62. When it is desired to firmly clamp the mechamism 24 to the wall 62 hydraulic pressure is applied to the right side of each cylinder 120 thus overcoming the substantial upsetting force applied against the member M1 during the upsetting operation. Vertical keyway guides (not shown) may be formed in adjacent surfaces of the walls 62,82 to receive a key for accurately guiding the clamping mechanism when moved vertically.

The hydraulic cylinder 30 (FIGS. 1-3) has its cylinder case 34 mounted in a bore in the wall 66. A partially threaded extension 32' of the piston rod 32 extends through a hole in the wall 64 which is countersunk to receive a stop ring 130 that acts as an abutment to be engaged by a calibrated adjustable stop 132 which limits the stroke of the piston rod extension 32' when moving in the upsetting direction which is to the left in FIGS. 1-3. The ring 130 has two functions; the first function is to prevent accidental crushing of the fingers of an operator when the calibrated ring 132 is moved into engagement with the ring 130, and the second function is to permit easy replacement of the ring 130 when the ring is crushed by repeated impacts with the calibrated ring 132. The calibrated ring 132 is threaded on the piston rod and has calibration marks thereon which permit the upsetting stroke to be easily and accurately adjusted in one thousands of an inch increments.

The left end (FIG. 2) of the piston rod extension is rigidly secured to a transducer 133 which is secured to a tool fixture platen 134 which has a spacer box 136 bolted thereto. An inert atmosphere hood supporting block 137 and an adapter 138 are releasably connected to the space box 136. The adapter 138 is provided with the previously mentioned member supporting cavity 35 (FIGS. 8 and 9) The cavity 35 is machined to conform to the external shape of the member M2 which is to be welded to the member M1 as previously described. The adapter 138 is releasably connected to the member M2 by a set screw 140 as best shown in FIG. 8 and may be removed and replaced by other adapters if a different workpiece, such as members M2' or M2'' (FIG. 1A) are to be welded to the member M1.

The tool fixture platen 136 (FIGS. 1-3) is rigidly secured to four tie rods 144 each of which extends through busings 146 fitted in the bores in the walls 64 and 66. Each tie rod 144 has a dust cap 147 closing the bores in the wall 66, and has a reduced diameter shouldered portion on the other end which snugly fits within a bore in the tool platen 134. As best shown in FIG. 2, cap screws 150 are secured in threaded bores 152 in the tie rods 144 thereby rigidly connecting the fixture platen 134 to the tie rods 144.

As previously described, the pressure applying stroke of the piston rod extension 32' may be stopped by abutment between the ring 130 (FIG. 2) and the calibrated ring 132.

When welding a large plurality of indentical members together, such as member M1 and M2 (FIGS. 8 and 9) the calibrated ring 132 may be screwed away from the ring 130 so that the rings do no contact during the pressure upsetting operation. The required compressive force can be determined and set in a control circuit (not shown) connected to the transducer 133 for providing the desired upsetting force on the ends of the members M1 and M2 without further operator assistance or the need of a physical stroke limiting stop. Thus, the force transducer 133 is relied upon to provide the proper welding pressure to assure that the heated ends of the members M1 and M2 are reliably welded together.

Although not illustrated, it will be understood that the cylinder 30 is connected to a source of hydraulic fluid through conventional fast acting valving and a plurality of conventional hydraulic accumulator tanks which compress a gas above the hydraulic fluid for assuring rapid actuation of the ram in the upsetting direction.

As diagrammatically shown in FIGS. 1-3 and 7-9, an inert atmosphere control hood 44 is removably mounted on the hood supporting block 137. A substantially inert gas such as argon, helium, nitrogen or a mixture of about 95% argon and 5% hydrogen is directed past the weldable surfaces S1,S2 of the members M1 and M2 during the induction heating operation and the pressure upsetting or welding operation which occurs rapidly within a matter of seconds. The inert gas removes oxygen from the surfaces to be welded thereby preventing poor welds due to oxidation and resulting scaling of the material from the surfaces being welded together. The specific details and the manner of operation of the inert atmosphere control hood 44 are disclosed in the cross-referenced Brolin et al application Ser. No. 895,085 filed on Aug. 11, 1986 which application is incorporated by reference herein. It will also be understood that the apparatus 20 is ideally suited for welding in an oxygen free atmosphere such as in outer space since the welding process is clean and spatter free.

The two transformers 46,48 (FIGS. 3 and 4), the rotary bus bar joint 38, and the induction coils 40,42 are adjustably supported on the frame 22 by conventional lathe type way 162. The way 162 includes a carriage 164 (FIG. 4) rigidly secured to the frame 22 and to a slide 165 upon which the transformers 46,48 and bus bars 166,166' (FIGS. 5 and 7) of the rotary bus bar joint 38 are rigidly supported. The way 162 also includes a feed handwheel 170 (FIG. 3) and a screw mechanism (not shown) which enables the operator to move the transformers 46,48 and induction coils 40,42 longitudinally of the induction welding apparatus 20 to precisely center the induction coils 40,42 between the weldable surfaces S1,S2 of the members M1,M2 to be welded together. The transformers 46,48 are capable of operating at 9,600 cycles per second but are preferably operated at about 6,000 cycles per second when welding steel tubes together that are between about 204 inches in diameter. It will be understood that different materials may require different frequencies.

The rotary bus bar joint 38 is best illustrated in FIGS. 5 and 7 with the flow of coolant through the bus bar joint being illustrated in FIG. 6. Since the right half of the bus bar joint is a mirror image of the left half, the left half will be described in detail while the right half will be identified by the same numerals followed by a prime (').

The bus bar joint 38 includes a left bus bar 166 which includes a pair of copper mounting blocks 182,184 that are rigidly secured to blocks 185,186 of bus bars 187,188 of the transformer that are separated by insulation 190. The right bus bar 166' is, of course, similarly connected to the right transformer 48.

The left bus bar 166 includes a pair of copper plates 192,194 brazed to the associated mounted blocks 182,184, respectively. The copper plates and blocks 182,184 are separated by an insulation strip 196 all of which have a 90° bend therein. The insulation strip 196 projects between the copper blocks 182,184 which are secured in clamping engagement with the insulation strip 196 by insulated capscrews (not shown) connected to the insulated wall 186 attached to the transformer 46. Thus, the two copper plates 192 and 194 define two spaced electrical conduits capable of carrying a very high current.

Two rectangular copper tubes 202,204 are brazed to the outer surfaces of the plate 192 and to the blcok 182 which have water passages therein for directing cooling fluid, preferably water, therethrough. Similar tubes (not shown) but similar to tubes 197',198' on the right bus bar 166' are brazed to the outer surface of plate 194 and to the block 184 which has water passages therein for cooling the plate 194.

The other ends of the copper plates 192,194 and copper tubes are brazed to associated copper blocks 212,214 which are connected to copper blocks 216,218 by brass capscrews (not shown). The copper blocks 216,218 are brazed to copper tongues 222,224 all of which are separated by an insulation strip 225. The blocks and tongues form extensions of the plates 192,194 and are subject to frictional wear and preferably have their outer surfaces silver plated to reduce friction and to improve conductivity.

The copper blocks 182,184,212,214,216,218; and the four copper tubes 202,204 (and the equivalents of right tubes 197', 198') have fluid flow passages therein as best illustrated diagrammatically in the cooling conduit system 226 of FIG. 6. Inlet water enters the cooling conduit system through conduit 228, flows through passage 230 in the block 182, through the copper tubes 202,204 into blocks 212 and 216 and then combine in a passageway 232 in blocks 216 and 212. A transverse passage 234 in blocks 212,214 then causes the fluid to flow from block 212, through a passage in the insulation strip 196 and through passages in the block 214, 218, and the outer tubes 197,198 connected to the copper plate 194 for return to the block 184 and discharged through a conduit 236. The cooling water dissipates the heat formed in the bus bar 166 to a temperature that is low enough to prevent burns if touched by the operator.

In order to transmit electrical current and cooling water to the induction coil 40, and to change the input and output current paths leading to the coil 40 from separated vertical paths to separated horizontal paths, a rotatable arm 240 is formed from two copper sections 242 and 244.

The arm section 242 is non-linear in order to rotatably sandwich the tongue 222,224 between arm sections 242 and 244. The arm section 242 includes a rectangular copper cooling tube 246 with the arm section and tube brazed to each other and to a lower copper block 248 having water passages 250,252 (FIGS. 5 and 6) therein with the passages 252 communicating with an inlet water hose 254.

The arm section 244 is a linear section which includes a copper coolant tube 254 and an upper copper block 258 having coolant passages 260,262 communicating with opposite ends of the tube 256. The arm section 244 copper tube 256 and the upper block 258 are brazed together. A vertical electrical insulation strip 266 is disposed between the outer ends of the arm sections 242,244; and a horizontal insulation strip 268 is disposed between the lower block 248 and upper block 258 to electrically insulate the two arm sections and blocks from each other. The surfaces of the arm sections 242,244 which rotatably contact the surfaces of the tongues 222,224 are preferably silver plated to minimize frictional wear and to increase and improve conductivity.

In order to rotatably connect the left arm 240 to the tongues 222,224; and to connect the equivalent right arm 240' to the tongues 222' and 224'; an induction coil mounting blade 269 and pivot shaft 270 are rigidly connected together and are constructed from a non-metallic material. One side of the shaft 270 rotatably extends through a flanged and threaded tubular bushing 271. The bushing has an adjustment nut 272 screwed thereon which bears against the resilient O-ring 273 of non-conductive material which may be compressed a sufficient amount to establish good electrical contact between the tongues 222,224 and the associated arm sections 242,244. The ends of the pivot shaft 270 extends through holes 274,274' in lever arms 276,276' and are rigidly connected thereto by set screws 278,278'. The lever arms 276,276' are securely connected to the rotatable arms 240,240' and to the coil mounting blade 269, by non-conductive bolts 278 which extend through the holes in the lever arms 276,276', through the holes in the lower blocks 248,248' and upper blocks 258,258', and through holes in the coil mounting blade 269.

The left coil 40 is formed from copper tubing which is shaped to conform to the shape and size of the weldable surface S1 (FIG. 8) to be heated to an upsetting temperature. One end of the coil is brazed to an upper tube 282 which has its other end welded to an upper mounting block 284 having a flow passage 286 therein that communicates with the passage 262 in the upper block 258 when the block 258 and 284 are bolted together. Similarly, a lower copper tube 288 is brazed to the other end of the coil 40 and to a lower copper block 290 which is bolted to the lower copper block 248. The coolant flow passage 250 in block 248 communicates with a flow passage 292 in block 290. Thus, coolant flows from inlet hose 254 through conduits in the direction indicated in FIG. 6. More particularly, the coolant flows from hose 254, through lower conduit 252, through copper tube 246 into passage 250 in lower block 248, through a passage 292 in block 290, through the lower copper tube 288, through the coil 40, through the upper tube 282, through the passage 286 in the upper block 284 and into passage 262 in the upper block 258 which then flows through copper tube 256 and passage 260 in the upper block 258 and is discharged through a hose 293.

It will be noted that the ends of the coils 40,42; upper tubing 282 and lower copper tubing 288, upper block 284 and lower block 248 are electrically insulated from each other by an insulation strip 294. These components are also insulated from each other by one or more vertical insulation strips 296. In order to firmly support the coils 40,42, angle bars 298,298' are welded to the lever arms 276,276' and project below the induction coils. A non-metallic insulation plate 299 is bolted to the bars 298,298' and provide support for the lower surfaces of the copper tubes 288,288' that are connected to the coils 40,42.

A fast acting air cylinder 300 (FIGS. 4, 5 and 7) has a piston rod 302 pivotally connected to a rod 304 secured to the lever arms 276,276'; and has its case end pivotally connected to a bracket 308 (FIG. 4) that is secured to the previously described longitudinally movable slide 165 that permits coils 40,42 to be moved to different positions longitudinally of the induction welding apparatus 20.

FIG. 10 illustrates members M1a and M2a having weldable surfaces S1a and S2a of different cross-sectional areas. In order to simultaneously raise both surfaces S1a and S2a to their upsetting temperatures, a large coil 40a is disposed adjacent the large surface S1a while a smaller coil 42a is disposed adjacent the surface S2a. In order to more effectively concentrate the induced heat into the surfaces S1a and S2a, both coils 40a and 42a have U-shaped laminations 310,312 formed thereon, which laminations 310,312 are preferably constructed of silicon iron of about 0.007 inches thick and control ver high magnetic fields. A non-metallic insulating disc 314 is disposed between the two coils 40a,42a.

A pair of sensors, preferably optical temperature sensors 316,318 such as infrared pyrometers, are provided to detect the temperature of the surfaces S1a and S2a. The amount of current directed to the coils 40a,42a or the length of time the current is applied, or both, may be varied so that both surfaces S1a, and S2a are raised to the upsetting temperature at the same time. The cross-referenced Brolin et al U.S. application Ser. No. 896,904 filed on Aug. 11, 1986 discloses and claims the preferred circuitry for controlling the heat applied to the surface S1a and S2a along with the controlling of many other functions of the apparatus.

FIG. 11 discloses a pair of induction coils 40b and 42b adapted to heat the end surfaces S1b and S2b of solid cylindrical members M1b and M2b to upsetting temperatures. The end surfaces of the members are drilled to provide short holes 318,320 therein which received some of the upset material during the pressure applying upsetting operation.

FIG. 12 discloses a pair of substantially square induction coils 40c and 42c adapted to heat the end surfaces S1c and S2c of square or rectangular members M1c and M2c to upsetting temperature.

In operation of the induction welding apparatus 20 (FIGS. 1-4) of the present invention, the operator first determines the type of members M1 and M2 to be induction heated and pressure welded together. If the members are of relatively small diameter tubular construction such as 2½ inch outside diameter tubes having wall thicknesses of about 0.2 inch, are of the same material and having weldable surfaces S1, S2 of the same size, the operator may select a single coil such as coil 40 along with certain cooling passages to simultaneously heat both surfaces S1 and S2 of the members M1 and M2 to be welded together.

Assume, however, that the operator selects the two coils 40,42 (FIGS. 1-4 and 5) to weld members M1,M2 together. The operator then sets up the machine by first mounting the two coils to the blocks 248,258 and 248′,258′ as shown in FIG. 5. The operator then positions member M2 in the cavity 35 (FIG. 8) of the adapter 138 with the piston rod 32 of the ram 30 fully retracted. The operator then operates the handwheel 170 (FIG. 3) to adjust the two transformers 46,48 and the coils 40,42 longitudinally of the apparatus 20 to an induction heating position wherein a small air gap is disposed between the weldable surface S2 of the member M2 and the adjacent face of the coil 42. The operator then places the member M1 in the chuck 26 and in the clamping mechanism 24 and clamps the member M1 between the jaws 28 of the chuck manually; and thereafter hydraulically closes jaws 96 by actuating the hydraulic clamping cylinders 88 with the weldable surface S1 of member M1 being spaced from the adjacent surface of the coil 40 by a small air gap when the coils 40,42 are in their heating position illustrated in FIG. 8. With the member M1 clamped in the clamping mechanism 24, the operator determines if the longitudinal axis of the member M1 coincides with the longitudinal axis of the member M2. If the axes of the members do not coincide, the operator actuates cylinders 116 to move the piston rods 119 and their extensions 114 to the right (FIGS. 1 and 2) and then operates the handwheel 102 to raise or lower the member M1 until it is properly aligned in welding position with the member M2. The operator then actuates a conventional valve to cause cylinders 116 to move the piston rods and rod extensions 114 to the left (FIGS. 1 and 2) thereby firmly clamping the clamped mechanism 24 against the wall 62 and the member M1 between the jaws 94,98.

If the member M1 is tubular and the end portions of the tube adjacent the surface S1 is not sealed by another means, an expandable plug 37 (FIG. 1A) is expanded by air pressure from air conduit and valve 37′ to prevent air from flowing around the weldable surfaces S1,S2 during the induction heating and pressure upsetting operations.

After the members M1 and M2 have been mounted as above described, the inert atmosphere hood 44 (FIGS. 1-3 and 7-9) is mounted on the hood supporting block 137 in the induction heating position as shown in phantom lines in FIG. 8 and in the upsetting position as shown in FIG. 9. The hood 44 and its manner of opration is fully disclosed and claimed in the cross-referenced Brolin et al U.S. application Ser. No. 895,085 filed on Aug. 11, 1986.

Briefly, the hood 44 is manually mounted about and sealed to the outer surfaces of the members M1 and M2 and includes an upper portion removably connected to a lower portion so that both portions may be removed from the members when welded together. When in operative position a substantially inert gas such as argon, helium, nitrogen or a 95% mixture of argon and hydrogen are directed past the weldable surfaces S1,S2 in a laminar flow which purges air from the surfaces S1,S2 and discharges it through diffusers or pads, which are preferably formed of vinyl or urethane foam, in the lower end of the hood. The foam pads are split to permit the coils 40,42 to move into and out of the hood.

After the induction heating pressure welding apparatus 20 has been set up as above described, the operator actuates control circuits which are disclosed and described in the cross reference Brolin et al U.S. application Ser. No. 896,904 filed on Aug. 11, 1986 to place the machine in operation.

With the inert gas flowing past the surfaces S1 and S2, and with the two coils raised to operative position shown in FIG. 8, an oxygen detector senses the gas in the hood 44 and energizes the induction coils when the detector detects an insufficient amount of oxygen in the hood to adversely affect the weld. The control circuit maintains the induction coils energized until temperature sensing means in the control circuit indicate that the weldable surfaces S1,S2 have been raised to the upsetting temperature at which time the circuit first actuates the air cylinder 300 to move the induction coils 40,42 from between the members M1,M2 and then actuates the hydraulic cylinder 30 thereby forcing member M2 against member M1 with suffieient force to upset the heated material adjacent the weldable surfaces S1,S2 as shown in FIG. 9 thus completing the weld. The induction heating and pressure welding steps require about five seconds. During this time the coolant, preferably water, is directed through the bus bar and induction coil assembly as shown in FIGS. 5 and 6 to cool the assembly. It will be understood that the copper tubing 246,256 and 246′,256′ (FIG. 5) cool the surfaces of the rotary joint.

After the weld has been completed the set screw 140 (FIG. 8) is released from member M2, the cylinder 30 retracts the box 136 and block 137 (FIG. 9) away from member M2, is retracted to the FIG. 8 position, the gas supply to the hood 44 is turned off and the hood is separated and removed from the apparatus 20. The welded members M1,M2 are then unclamped from the chuck 26 and the clamping mechanism 24 and are removed from the apparatus 20 thus completing one cycle of operation. Other cylces of operation on the same type members may take place without again setting up the machine except for positioning the members M1 and M2 in welding position and clamping the member M1 in the heating position. Also, hood 44 is remounted around the members M1 and M2 and secured to the hood supporting member 137.

If tubular members M1a and M2a (FIG. 10) having different weldable surface areas are to be welded together, the induction coils 40a, 42a are substituted for the coils 40,42 and the operation is repeated.

If metals of different types, for example, steel to cast iron or brass to copper are to be welded together, laminated induction coils of the same size or different sizes similar to the coils 40a and 42a may be used and be simultaneously raised to the required upsetting temperatures.

Similarly, the FIG. 11 induction heads 40b and 42b may be substituted for the heads 40 and 42 when solid metal rods 41b and 42b are to be welded together. Likewise, induction coils of different shapes and sizes such as the induction coils 40c and 42c (FIG. 12) may be used to weld members of different sizes, shapes, and metals together following substantially the same steps as described above in regard to welding members M1 and M2 together.

From the foregoing description it is apparent that the induction heating and pressure welding apparatus of the present invention is capable of welding metals of different sizes and shapes and of different types together while in a substantially inert atmosphere by separately heating the weldable surfaces of two members by independently controlled induction coils. Immediately thereafter, the two members are pressed together with sufficient force to upset the weldable surfaces thus welding the two members together. The apparatus is capable of being manually operated, but is preferably operated in a semi-automatic manner to provide consistently good welds when making a plurality of identical welded parts.

Although the best mode contemplated for carrying out the present invention has been herein shown and described, it will be apparent that modification and variation may be made without departing from what is regarded to be the subject matter of the invention.

What is claimed is:

1. In an induction heating pressure welding apparatus, a rotary bus bar joint comprising:
   a two piece conductive bus bar including a tongue operatively connected to a source of high frequency current;
   first insulator means for electrically insulating one piece of said bus bar from the other piece;
   a two piece conductive arm mounted on said two piece bus bar for arcuate movement about an axis with said arm pieces being electrically connected to associated bus bar pieces;
   second insulator means for electrically insulating one piece of said arm from the other piece;
   an induction coil conforming to the shape of the weldable surfaces to be welded together and having two ends;
   means electrically connecting one end of said coil to one piece of said arm and electrically connecting the other end of said coil to said other piece of said arm;
   third insulating means for electrically insulating the ends of said coil and said electrical connecting means from each other;
   means for pivoting said arm and said coil about said axis; and
   means for cooling said bus bar, said tongue, said arm, said coil and said connecting means.

2. An apparatus according to claim 1 wherein said first and second insulating means are disposed normal to each other for changing the flow of said high frequency current between generally vertical paths and generally horizontal paths.

3. An apparatus according to claim 2 wherein said bus bars, tongues and arms include conductive plates that are narrow horizontally and wide vertically, and wherein said coil and said connecting means are wide horizontally and narrow vertically for heating weldable surfaces that are disposed vertically on horizontally disposed members.

4. An apparatus according to claim 1 and additionally comprising means defining coolant passages in said two piece bus bar, said two piece arm, said connecting means and said coil; and means for directing a coolant through said coolant passages.

5. An apparatus according to claim 1 wherein said bus bars, tongues and arms include conductive plates that are narrow in a first direction and wide in a second direction, and wherein said coil and said connecting means are wide in said first direction and narrow in said second direction for heating weldable surfaces that are disposed in said second direction on members elongated in said first direction.

6. In an induction heating pressure welding apparatus, a rotary bus bar joint comprising;
   a two piece electrically conductive bus bar operatively connected to a source of high frequency current;
   a two piece electrically conductive tongue projecting from one end of said bus bar and having a first holes therein defining a pivot axis;
   first electrical insulating means disposed between said two pieces of said bus bar and said tongue for providing two separate circuits, said electrical insulating means in said tongue lying in a predetermined plane;
   a two piece electrically conductive arm having second pivot holes in one end portion and each arm having a separate mounting block on the other end portion;
   tubular connecting means of non-conductive material inserted through said first and second holes for pivotally connecting said two piece arm in electrical conductive engagement with said two piece tongue;
   second electrical insulating means disposed in a plane normal to the plane of said first insulating means for electrically separating said two pieces of said arm from each other for providing two separate electrical circuits;
   a tubular electrically conductive induction coil shaped to conform to the shape of the weldable surfaces of two members to be welded together and having spaced end portions;
   a first electrically conductive connecting means connecting one end portion of said coil to one of said blocks;
   a second electrically conductive connecting means connecting the other end portion of said coil to the other block;
   a mounting blade of non-conductive material connected to said two piece arm;
   means operatively connected to said arm for moving said two piece arm and coil in an arcuate path around said pivot axis; and
   means for cooling said bus bar, said tongue, said arms, said conducting means and said coil.

7. An apparatus for induction heating and pressure welding weldable surfaces of two members together comprising:
   a frame;
   a hydraulic cylinder secured to said frame and having a piston rod adapted to support a first member and being movable between a surface heating position and a surface upsetting position;
   clamping means secured to said frame and adapted to securely clamp second member in fixed position with a weldable surface disposed in alignment with the weldable surface of said first member;
   hood means for directing a laminar flow of substantially inert gas past said weldable surfaces for purging air from said surfaces;
   means defining an induction heating coil movable between a first position disposed between and spaced a short distance from said surfaces for heating said surfaces to an upsetting temperature, and a second positon out of alignment with said weldable surfaces for allowing said hydraulic cylinder to immediately thereafter force said first member against said second member with sufficient force to upset said heated surfaces and weld said two surfaces together,
   means for directing a high frequency current through said coil when in said first position to heat said surfaces to an upsetting temperature;
   said clamping means including a bodily adjustable sub-frame movable supported by said frame, a first V-block gripper head rigid with said sub-frame, a second V-block gripper head carried by said sub-frame and movable relative to said first V-block gripper head for clamping said second member therebetween, and adjustment means for moving said sub-frame between a position wherein said weldable surfaces of said first and second members are out of alignment with each other to a position wherein said surfaces are in weldable alignment with each other;

said sub-frame abutting a portion of said frame having T-slots therein, a plurality of hydraulic cylinders secured to said sub-frame, a piston rod in each cylinder, a T-bar operatively connected to each piston rod and slidably received in said T-slots, when said sub-frame is in locked position, each position rod being retracted to rigidly connect said sub-frame to said frame.

when said sub-frame is to be adjusted each piston rod being moved to permit sliding movement of said T-bars in said slides.

8. An apparatus for induction heating and pressure welding weldable surfaces of two members together comprising:
a frame,
a hydraulic cylinder secured to said frame and having a piston rod adapted to support a first member and being movable between a surface heating position and a surface upsetting position;
clamping means secured to said frame and adapted to securely clamp second member in fixed position with a weldable surface disposed in alignment with the weldable surface of said first member;
hood means for directing a laminar flow of substantially inert gas past said weldable surfaces for purging air from said surfaces;
means defining an induction heating coil movable between a first position disposed between and spaced a short distance from said surfaces for heating said surfaces to an upsetting temperature, and as second position out of alignment with said weldable surfaces for allowing said hydraulic cylinder to immediately thereafter force said first member against said second member with sufficient force to upset said heated surfaces and weld said two surfaces together,
means for directing a high frequency current through said coil when in said first position to heat said surfaces to an upsetting temperture;
said hood means inlcuding open cell foam rubber pads therein for allowing said induction heating coil to be moved into said hood between said weldable surfaces and out of said hood and for maintaining a substantially inert atmosphere around said weldable surfaces which is at a higher pressure than the pressure externally of said hood and progressively decreases in pressure from one end to the other end of said hood.

9. An apparatus according to claim 8 and additionally comprising means for operatively connecting said hood to said piston rod when said surfaces are being heated to an upsetting temperature and when said heated surfaces are being upset.

10. An apparatus for induction heating pressure welding two weldable surfaces of two members together, comprising:
means defining at least one induction coil;
pressure applying means for moving at least one of the members along a presure applying path;
means for supporting the two members with said weldable surfaces spaced from each other;
means for providing a laminar flow of a substantially inert gas around said weldable surfaces;
means for establishing relative movement between said members and said induction coil for first positioning the coil in close proximity between said weldable surfaces and for thereafter spacing said coil from the pressure applying path of movement of said weldable surfaces;
means for directing a high frequency current through said coil when positioned between said weldable surfaces to heat said surfaces to an upsetting temperature;
means for forcing said weldable surfaces together with sufficient force to upset said heated surfaces for welding said surfaces together when said coil is spaced from said surfaces;
said coil means having opposed heating surfaces disposed between weldable surfaces of different areas, and means for positioning one of said heating surfaces of said coil means closer to the weldable surface having the larger area with the other heating surface being spaced a lesser distance from the smaller weldable surface for controlling the temperature rise in each weldable surface for substantially simultaneously raising both weldable surfaces to the upsetting temperature.

11. A method of induction heating pressure welding weldable surfaces of two members together using at least one induction coil and pressure applying means for moving at least one of the members along a pressure applying path comprising the steps of:
supporting the two members with said weldable surfaces spaced from each other;
providing a laminar flow of a substantially inert gas around said weldable surfaces;
establishing relative movement between said members and said induction coil for first positioning the coil in close prosimity between said weldable surfaces and for thereafter spacing said coil from said pressure applying path of movement of said weldable surfaces;
directing a high frequency current through said coil when between said weldable surfaces to heat said surfaces to an upsetting temperature;
forcing said weldable surfaces together with sufficient force to upset said heated surfaces for welding said surfaces together when said coil is spaced from said surfaces; and
wherein the weldable surfaces are of different areas, and wherein the coil has opposied heating surfaces disposed between the weldable surfaces of different area; and including the step of positioning one of said opposed heating surfaces of said coil closer to the weldable surface having a larger area than the surface having a smaller area for controlling the temperature rise in each weldable surface for substantially simultaneously raising both weldable surfaces to the upsetting temperture.

* * * * *